United States Patent [19]

Kenzie

[11] Patent Number: 4,513,931
[45] Date of Patent: Apr. 30, 1985

[54] DEREEFING CUTTER

[75] Inventor: E. Dennis Kenzie, Fort Erie, Canada

[73] Assignee: Aero-Safe Technologies Inc., Fort Erie, Canada

[21] Appl. No.: 465,220

[22] Filed: Feb. 9, 1983

Related U.S. Application Data

[63] Continuation of Ser. No. 212,182, Dec. 2, 1980, abandoned.

[51] Int. Cl.³ .............................................. B64D 17/36
[52] U.S. Cl. ................................................... 244/152
[58] Field of Search ............... 244/152, 147, 149, 150; 30/180, 182; 83/586, 524; 294/83 AA

[56] References Cited

U.S. PATENT DOCUMENTS

| | | |
|---|---|---|
| 2,763,451 | 9/1956 | Moran .......................... 294/83 AA |
| 2,833,498 | 5/1958 | Colt ............................. 244/150 |
| 2,995,323 | 8/1961 | Dann ............................ 244/150 |

FOREIGN PATENT DOCUMENTS

| | | | |
|---|---|---|---|
| 979155 | 4/1951 | France ........................ 244/83 AA |
| 278695 | 4/1928 | United Kingdom ............... 244/150 |
| 609000 | 9/1948 | United Kingdom ............... 244/150 |
| 873640 | 7/1961 | United Kingdom ............... 244/152 |

*Primary Examiner*—Galen L. Barefoot
*Attorney, Agent, or Firm*—Hirons, Rogers & Scott

[57] ABSTRACT

A dereefing cutting includes a knife actuated by a spring which is held in a preloaded condition by a latch mechanism. The latch includes a detent which is held in place by a timer mechanism. Upon partial opening of the canopy, the timer mechanism is actuated and, after a predetermined delay, releases the detent. The knife is urged by the preloaded spring to cut the reefing line and fully release the parachute canopy.

20 Claims, 8 Drawing Figures

DEREEFING CUTTER

This application is a continuation of application Ser. No. 212,182, filed Dec. 2, 1980, now abandoned.

The present invention relates to dereefing cutters for use with parachutes.

It is well known to dispatch cargo loads from aircraft for recovery by parachute systems. In some cases, if the parachute canopy is allowed to develop to its full flying diameter immediately upon dispatch from the aircraft, the shock loads imposed upon the canopy will cause it to break up. A method of attenuating the shock loads is to deploy the canopy in two stages by initially restricting the opening of the canopy. This is achieved by a continuous nylon line, known as a reefing line, which passes through rings spaced around the periphery of the canopy. The length of the reefing line is less than the circumference of the canopy so that the line restricts the opening of the canopy.

To allow full opening of the canopy after the initial deceleration period, the line is released by a dereefing device attached to the parachute. Usually two dereefing devices are used, one diametrically opposite the other. A delay is usually incorporated in the device so that it will operate 2 to 6 seconds after activation by tension in one of the parachute rigging lines generated by the initial opening of the canopy.

Several types of dereefing devices have been proposed, the most common being a knife driven by a pyrotechnic device. The pyrotechnic device however poses problems in proof testing, which cannot be achieved without destroying the device, storage and transportation. These types are also expendible and therefore are relatively costly.

One known mechanical device releases an end loop formed on the reefing line rather than cutting the line. However, if more than one such device is positioned around the periphery, as is usually necessary, any slight discrepancy in timing delays produces an erratic and non uniform canopy development.

There is therefore the need for a simple mechanical dereefing device which is reusable and reliable in operation. At the same time, the device must have sufficient power to sever the reefing line but be actuable by a lightweight timing device.

According therefore to the present invention there is provided a dereefing cutter for a parachute comprising a housing, an aperture in said housing to receive a reefing line, a knife to sever said reefing line, and positioned to one side of said aperture, biasing means to bias said knife toward and across said aperture, latch means to oppose said biasing means and retain said knife to said one side, and release means to release said latch means and permit movement of said knife means by said biasing means.

Embodiments of the present invention will now be described by way of example only with reference to the accompanying drawings in which.

Figure 1:
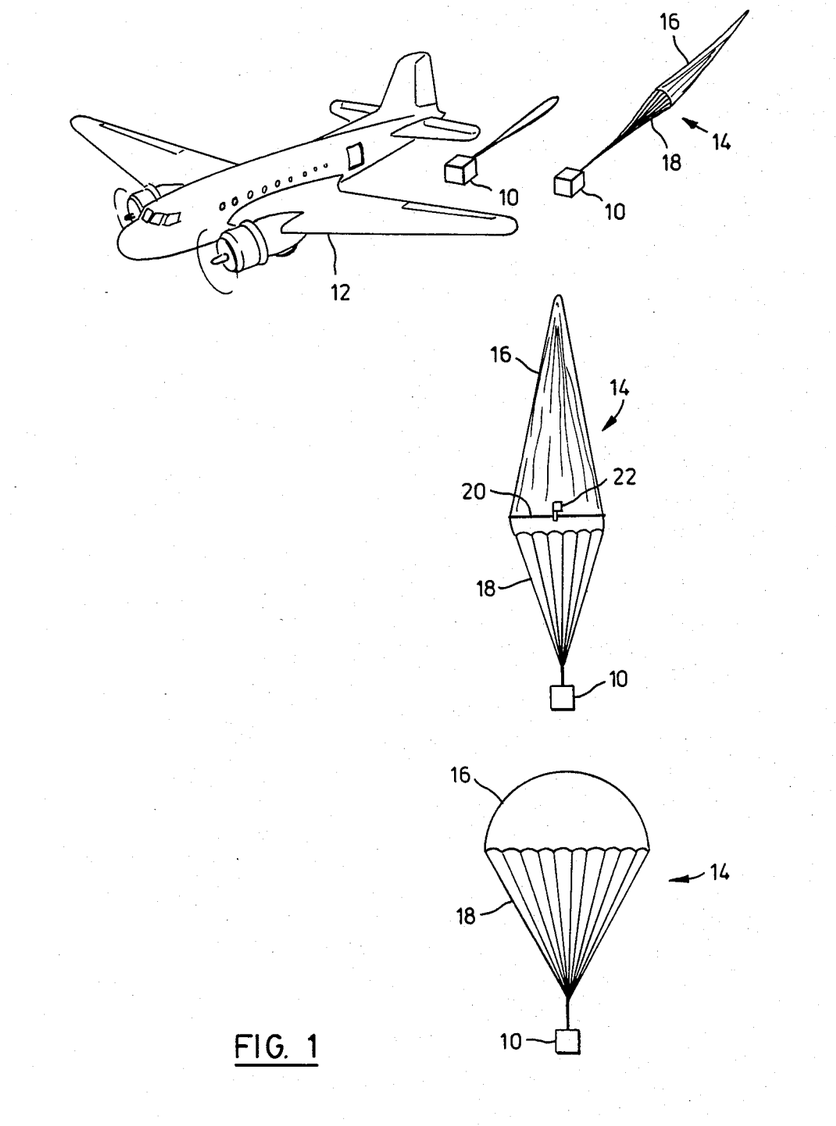
FIG. 1 is a diagramatic representation of the opening of a parachute.

Referring now to FIG. 1, a cargo 10 is dispatched from a plane 12 by means of a parachute 14. The parachute 14 includes a canopy 16 attached to the cargo 10 by a number of shroud lines 18. Initial opening of the canopy 16 is restricted by a reefing line 20 extending through loops around the perphery of the canopy 16. The line 20 passes through a dereefing cutter 22 which is attached to the canopy 16. Upon actuation of the cutter 22, the canopy 16 may develop fully to decelerate the cargo 10. In this manner, progressive deceleration of the cargo is achieved without undesirable shock loads.

Figure 2:
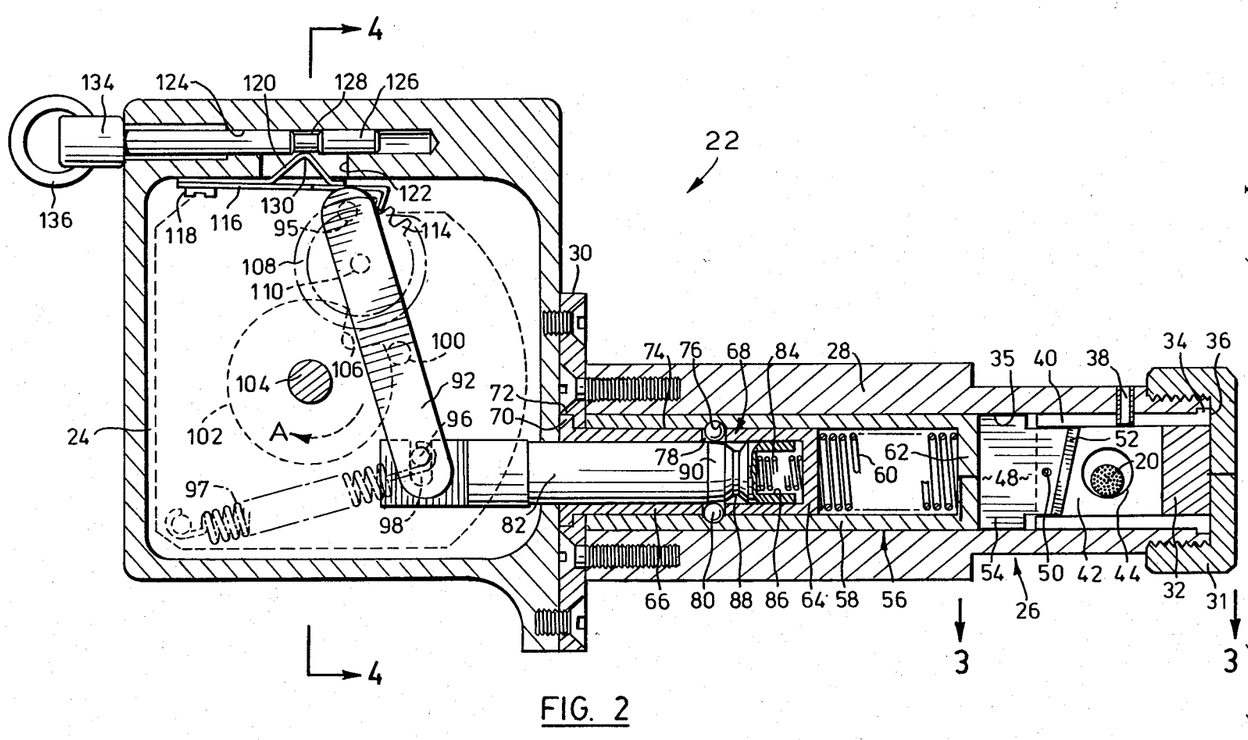
FIG. 2 is a sectional view of a dereefing device in a charged condition.
Figure 3:
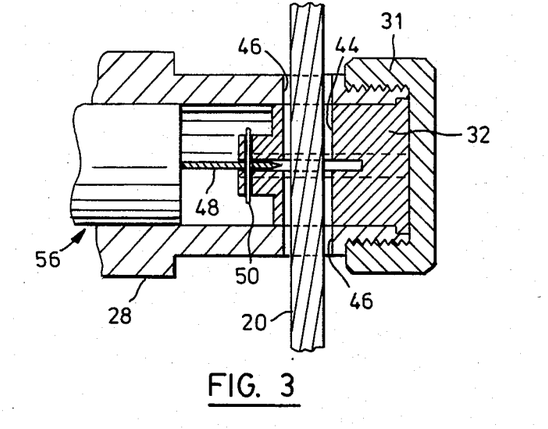
FIG. 3 is a section on the line 3—3 of FIG. 2.

The dereefing cutter 22 is shown in greater detail in FIG. 2 and includes a timer housing 24 and a knife barrel 26.

The knife barrel 26 is formed from a tubular sleeve 28 which is attached at one end to the timer housing 24 through a face plate 30. An anvil 32 is positioned within the opposite end of the sleeve 28 by a shoulder 34 which extends into a recess 36 on the inner surface 35 of the sleeve 28. A peg 38 extends through the sleeve 28 to engage a channel 40 in to outer surface of the anvil 32 to prevent rotation within the sleeve 28. A cap 31 is screwed onto the end of the sleeve 28 to hold the anvil within the sleeve 28.

The anvil 32 is formed with a longitudinal slot 42, which is aligned the channel 40, and a bore 44 which is perpendicular to the plane of the slot 42. The bore 44 is aligned with a pair of holes 46 in the sleeve 28 to permit the reefing line 20 to pass through the sleeve and across the slot 42.

A knife member 48 is slidably mounted in the slot 42 and is held in a fixed location to one side of the bore 44 by a shear pin 50. The knife member 48 includes a knife edge 52 adjacent the bore 44 and an enlarged head 54 which extends into engagement with the inner surface 35 of the sleeve 28.

The knife member 48 is driven by a piston assembly 56 which includes a piston 58 slidably received in the sleeve 28 and a spring 60. The spring 60 acts between an end face 62 of the piston 58 and an end face 64 of a retainer 66 which forms part of a latch mechanism 68.

The retainer 66 is in the form of a hollow cylinder which is closed at one end by the end face 64. A lip 70 at the opposite end is held in a recess 72 in the face plate 30 to axially locate the retainer within the knife barrel 26.

The radially inner surface 74 of the piston 58 is formed with a circumferential groove 76 which, in the position shown in FIG. 2, is aligned with a bore 78 extending diametrically through the retainer 66. A number of balls 80 are positioned in the bore 78 and engage with the circumferential groove 76.

A release pin 82 is slidably received in the retainer 66 with one end projecting into the timer housing 24. The pin 82 is biased toward the timer housing 24 by a spring 84 acting between the end face 64 and a recess 86 formed in the end of the pin 82. A groove 88 is formed in the outer surface of the pin 82 and is of sufficient dimensions to permit the balls 80 to move out of the groove 76 when the groove 88 is aligned with the bore 78. In the position shown in FIG. 2, the groove 88 is located between the bore 78 and the end face 64 so that a race 90 holds the balls 80 in the groove 76.

Figure 4:
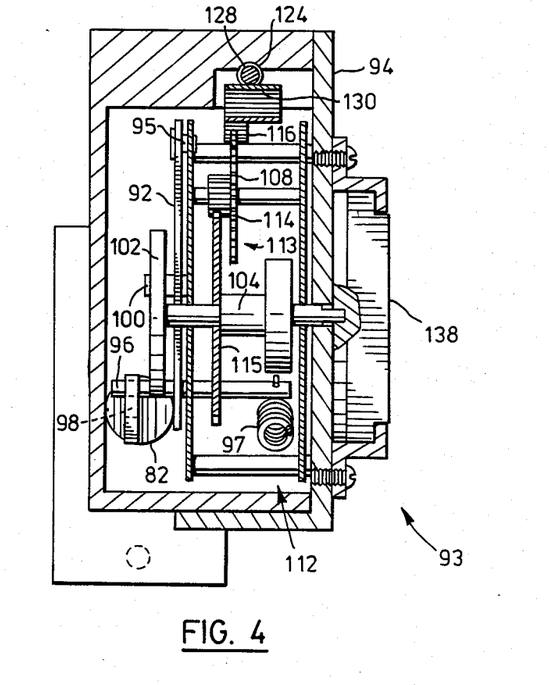
FIG. 4 is a section on the line 4—4 of FIG. 2.

The pin 82 is held against the bias of the spring 84 by a lever 92 which is pivoted by a pin 95 to a timing unit 93 mounted on the timer housing side wall 94 (FIG. 4). The lever 92 carries a pin 96 which slides in a slot 98 formed in the end of the pin 82. A coil spring 97 also extends between the pin 96 and the housing 24 to assist the spring 84.

A follower 100 is mounted on the lever 92 intermediate its ends and engages a cam wheel 102 which is mounted on an output spindle 104 of a time mechanism 112 forming part of the timing unit 93.

The cam wheel 102 has a recess 106 cut into its periphery so that the follower 100 can move toward the spindle 104 and the lever 92 pivot about the pin 95 when the recess 106 and the follower 100 are in alignment.

The timing mechanism 112 includes a gear train 113 which transmits drive from a spring (not shown) through an escapement to a drive gear 115 connected to the output spindle 104. A gear wheel 108 which meshes with the drive gear 115 has teeth 114 which are engaged by sprag 116 lock the gear train 113.

The sprag 116 is formed from a pair of leaf springs which are attached to the timer housing 24 by a screw 118 so that its inherent resilience causes it to move toward the wall of the housing 24. An upstanding projection 120 is attached to the rear of the sprag 116 and passes through an aperture 122 in to a bore 124 in the housing 24. A firing pin 126 is slidable in the bore 124 and has a notch 128 intermediate its ends. The apex 130 of the projection 120 engages with the notch 128 to hold the sprag 116 away from the housing 24 and in engagement with the teeth 114.

The head 134 of the pin 126 is provided with a ring 136 to permit attachment to one of the shroud lines 18 of the chute 14.

Figure 5:
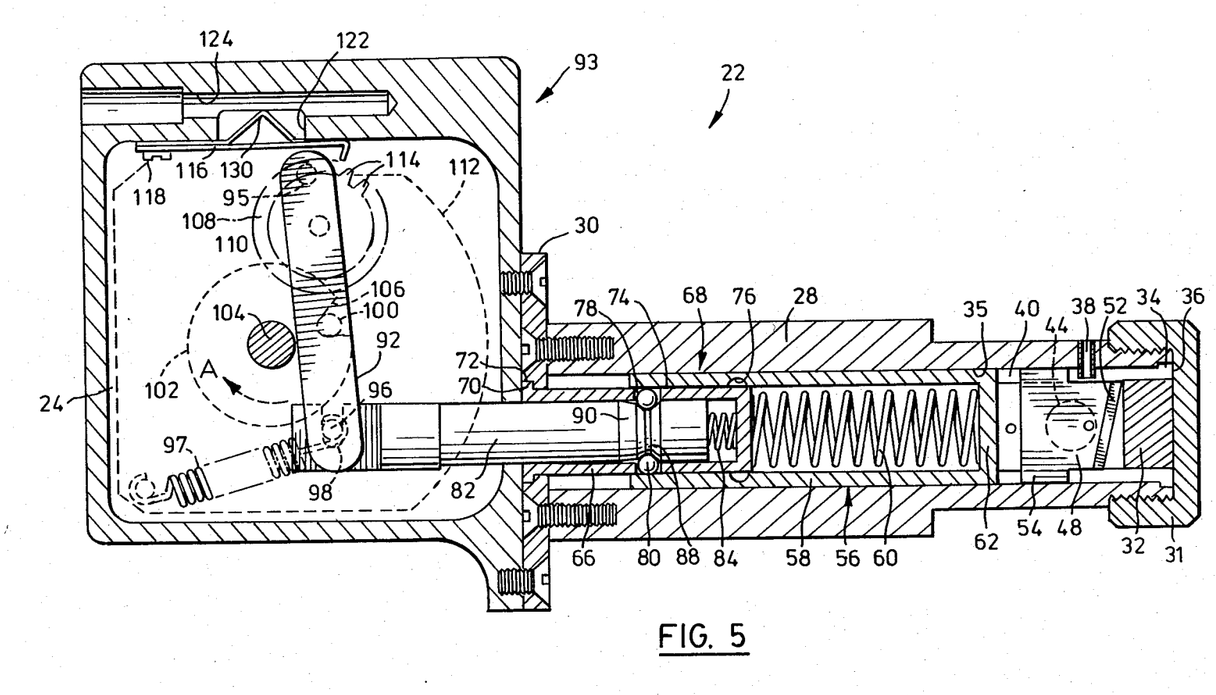
FIG. 5 is a view similar to FIG. 2 showing the device in a discharged condition.
Figure 6:
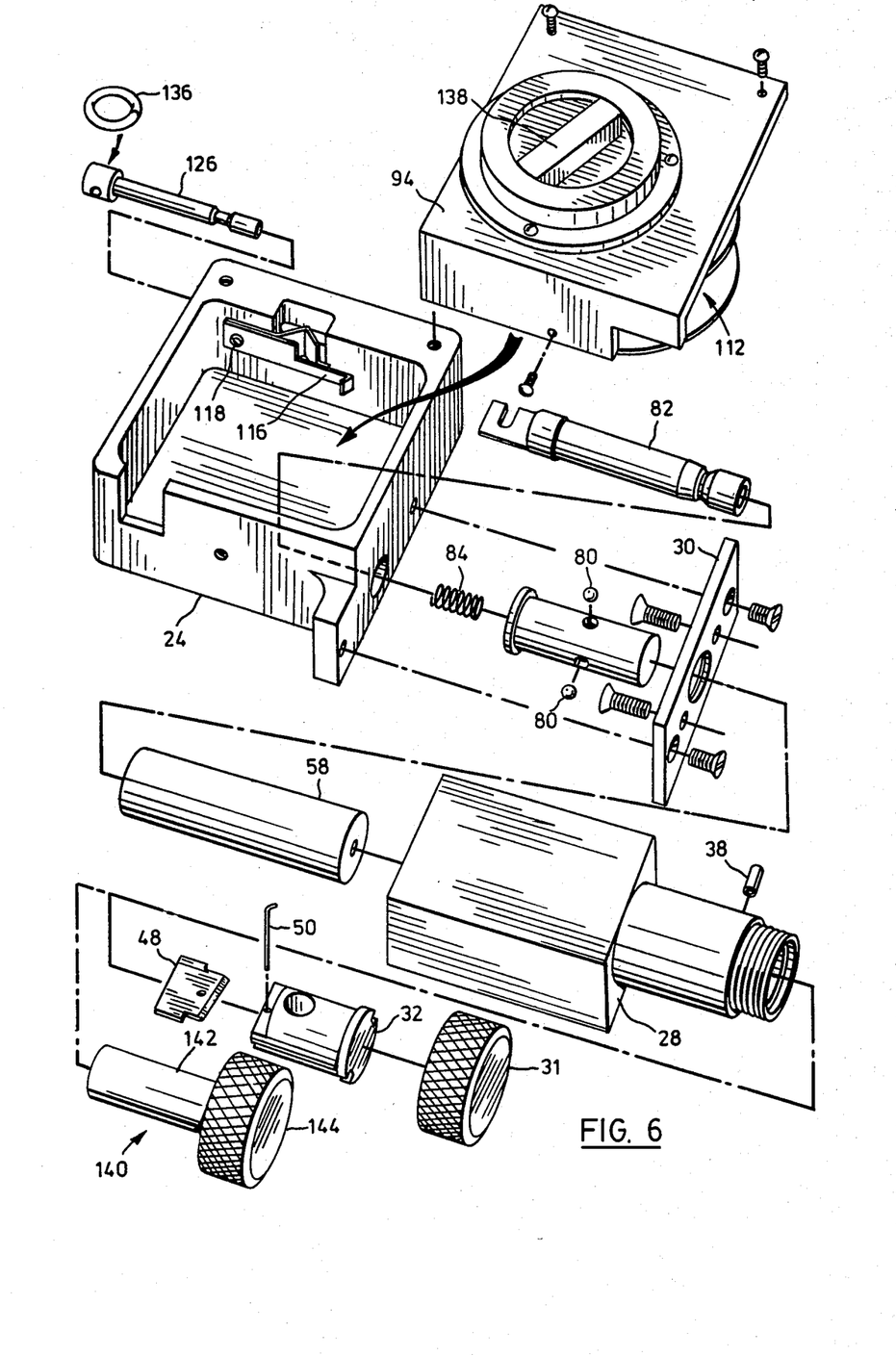
FIG. 6 is an explosed view showing the assembly of the device shown in FIG. 2.

The operation of the device will now be described assuming the cutter is in the discharged condition shown in FIG. 5.

The end cap 31 is removed and the anvil 32 and knife 48 extracted from the barrel 28. A priming tool 140 having a projecting spindle 142 is inserted into the barrel 28 so that the spindle 142 engages the end face 62. The tool 140 includes a threaded end cap 144 so that after depression of the tool 140 to compress the spring 60, the tool 140 may be secured to the barrel 28. In this condition, the groove 76 is aligned with the bore 78 so that the balls 80 may be radially displaced into a locking condition.

To displace the balls, a timer control knob 138 on the exterior of the housing 24 is rotated to any nominal setting. This rotates the spindle 104 anticlockwise to displace the follower 100 and move the release pin 82 against the bias of the spring 84. The balls 80 are thus displaced from the groove 88 and onto the race 90 where they are held in the locking position shown in FIG. 2. In this position, the piston assembly 56 is held against axial movement by the cooperation between the balls 80, the groove 76 and the bore 78.

The pin 82 is held against the bias of the spring 84 by insertion of the firing pin 126 which moves the sprag 116 into engagement with one of the teeth 114. The cam wheel 102 is then held against rotation with the follower 100 out of the recess 106.

The tool 140 may then be removed from the barrel 28 and the knife 48 located within the slot 42 in the anvil 32 by the shear pin 50. The knife 48 and anvil 32 ae then slid into the bore 35 with the peg 38 in alignment with the groove 40 in the anvil body to ensure that the bore 44 is aligned with the holes 46 and that the knife 48 is perpendicular to the common axis of the holes 46 and bore 44. The end cap 31 is then screwed onto the barrel 28 to hold the shoulder 34 of the anvil 32 in the recess 36. The cutter 22 is then in a primed condition ready for attachment to the parachute 14.

With the dereefing cutter 22 in the primed condition, the housing 24 is attached to a folded parachute 14 with the timer dial exposed. A shroud line is attached to the ring 136 and the reefing line passed through the holes 46 and the bore 44. The timer may be adjusted according to the dropping conditions and the cargo just prior to dispatch form the plane.

Upon dispatch of the cargo, the parachute package is opened by the rip cord or similar device so that the canopy 16 begins to open and places the shroud lines 18 in tension. The firing pin 126 is pulled from the housing 24 by the tension in the shroud line 18 and allows the sprag 116 to move toward the wall of the housing 24 and out of engagement with the teeth 114. The gear wheel 108 may then rotate on the spindle 110 so that the timer mechanism is able to rotate the cam wheel 102 in the direction of arrow A.

After a predetermined interval, during which the canopy is partially developed, the recess 106 is aligned with the follower 100 and the lever 92 pivots about the pivot 95 under the bias of the springs 84 and 97. The release pin 82 will move with the lever 92 to bring the groove 88 into register with the balls 80.

The bias of the spring 60 acts to displace the balls 80 from the groove 76 and into the groove 88 to permit the piston assembly 56 to move toward and into contact with the head 54 of the knife 48. The stored energy of the spring 60 is sufficient to break the shear pin 50 and drive the knife edge 52 through the reefing line 21. The canopy is then released and may develop fully to progressively slow the decent of the cargo 10.

After recovery of the parachute 14, the cutter may be conditioned for reuse by simply removing the end cap 30 and extracting the anvil 32 and knife 48. If the knife is in serviceable condition, a new shear pin 50 is fitted and the cutter reprimed as described above. Should the knife be damaged, a new knife may be substituted at relatively low cost prior to priming.

It will be apparent that a simple mechanism is provided which permits reuse of the dereefing cutter and non destructive testing of its operation. The use of the latching mechanism enables a comparatively low strength timer mechanism to be used whilst providing sufficient stored energy in the spring 60 to ensure cutting of the reefing line 20.

Figure 7:
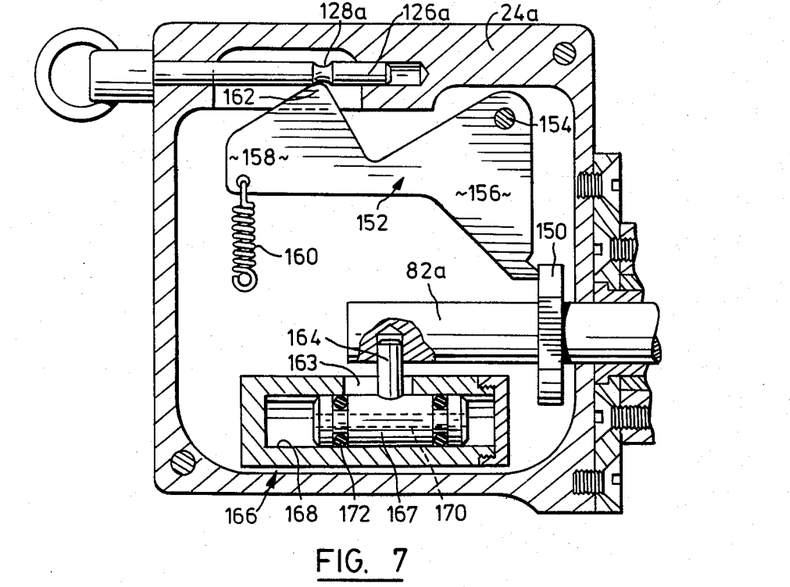
FIG. 7 is an alternative embodiment of timing device for use in the device shown in FIG. 2.
Figure 8:
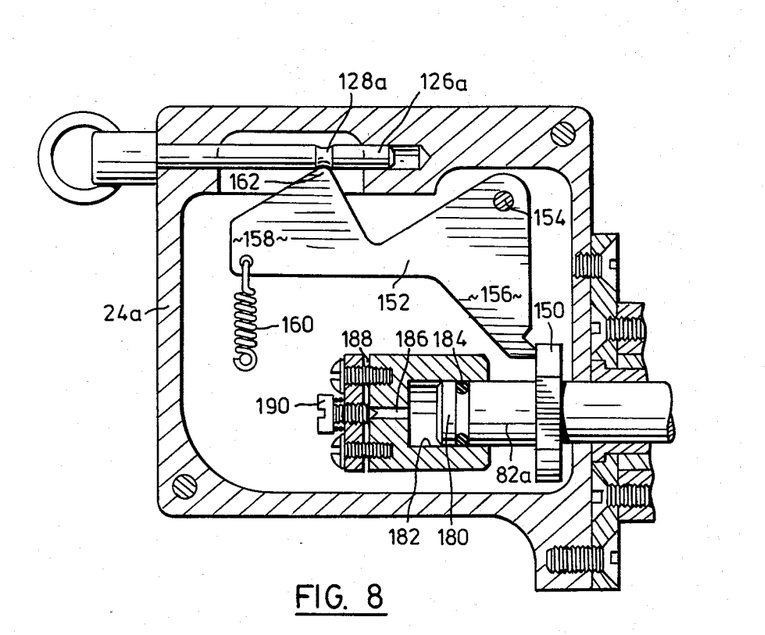
FIG. 8 is a further embodiment of timing device for use in the device shown in FIG. 2.

FIGS. 7 and 8 show alternative arrangements of timing devices with like reference numberals being used to denote similar parts. A suffix "a" has been added for clarity of description.

In both alternative embodiments, the release pin 82a is formed with a shoulder 150 within the timer housing 24a. A bellcrank 152 is pivoted in the housing on a pin 154 with one arm 156 engaging the shoulder 150 and the other arm 158 connected to a spring 160.

A lobe 162 is formed on the arm 158 to engage the groove 128a on the firing pin 126a.

In the embodiment of FIG. 7, the pin 82a engages a piston rod 164 of a dashpot 166. The piston rod 164 passes through a slot 163 in the dashpot 166 and is connected to a piston 167 which is slidably mounted within a cylinder 168. The piston 167 has an axial passage 170 to connect opposite ends of the cylinder 168. A pair of O-rings 172 seal the piston 167 in the cylinder 168 so that fluid must pass from end to end through the passage 170.

In the primed condition, the release pin 126a holds the bellcrank 152 against the shoulder 150 to prevent movement of the pin 82a.

Upon release of the firing pin 126a, the bellcrank is free to move clockwise about the pin 154 to permit movement of the release pin 82a under the bias of the spring 84a. The movement is transmitted to the piston rod 164 to displace the piston 167 in the cylinder 168. The rate of movement is determined by the diameter of the passageway 170 so that a predetermined interval will pass before the groove 88a is in register with the balls 80 to release the latching mechanism.

To reprime the cutter, it is simply necessary to displace the piston 167 in the cylinder 168. If preferred, a bypass with a one way check valve may be incorporated to permit rapid movement of the piston to the primed condition.

The arrangement shown in FIG. 7 avoids the use of a mechanical timer and so adds to the simplicity of the cutter. However, the time interval between removal of the firing pin 126a and release of the latching mechanism is fixed so that the device does not have the versatility of that shown in FIG. 2.

A degree of adjustability is provided in the embodiment of FIG. 8 in which the end of the pin 82a constitutes a piston 180 slidable within a cylinder 182 which is fixed to the housing 24a. An O-ring 184 seals the piston 180 within the cylinder 182 and fluid or gas (air) may be expelled by the piston 180 through a longitudinal passage 186 which intersects with a transverse passage 188. A conical tipped screw 190 is threaded into the cylinder 182 in alignment with the passage 186 and the tip adjusts the area of flow from one passage to the other. Thus adjustment of the flow rate from the cylinder 182 may be provided.

The operation of this device is similar to that described above in that removal of the firing pin 126a allows the release pin 82a to move under the influence of the spring 84a. The rate of movement will be determined by the rate of flow from the cylinder 182 and therefore the delay between removal of the firing pin 126a and release of the latching mechanism may be controlled by the setting of the screw 190.

If desired, the latching mechanism may be controlled by mechanisms other than time delays such as altitude sensing arrangements. It should be noted that the latching mechanism provides similar advantages when used with such devices since the release force required is comparatively low and the device is reusable.

What I claim is:

1. A dereefing cutter for a parachute comprising: a housing; an aperture in said housing to receive a reefing line; a knife to sever said reefing line and positioned to one side of said aperture; biasing means to bias said knife toward and across said aperture to sever a reefing line located in said aperture; latch means to oppose said biasing means and retain said knife to said one side; said latch means including a detent member slidably supported by a fixed member associated with said housing and operable upon a moveable member associated with said knife means, to hold said moveable member in a latched position against said biasing means; release means to release said latch means and permit movement of said knife means by said biasing means, said release means including:
   a release member moveable relative to said detent member from a first position in which said detent member prevents movement between said fixed and moveable members to a second position in which said detent member permits relative movement;
   a delay device having a time actuated by initial opening of said parachute to delay release of said latch means and movement of said knife means for a predetermined period; and
   a cam member and a follower operable between said timer and said release member, said cam member including a dwell portion to hold said release member in said first position and an actuating portion to allow said release member to move from said first to said second position, said cam member being rotatable by said timer and said actuating portion including a recess to allow said follower to move toward the axis of rotation of said follower.

2. A dereefing cutter according to claim 1 in which said biasing means acts between said fixed and moveable members.

3. A dereefing cutter according to claim 1 wherein said moveable member is slidably mounted on said fixed member for relative movement along a common longitudinal axis, said detent member being displaceable relative to said fixed member in a direction tranverse to said longitudinal axis.

4. A dereefing cutter according to claim 3 wherein said release member is slidably mounted for movement along said common longitudinal axis and includes a surface engageable with said detent member to control movement thereof transverse to said longitudinal axis.

5. A dereefing cutter according to claim 4 wherein said release member is slidably mounted within said fixed member and includes a groove in said surface to permit said transverse movement.

6. A dereefing cutter according to claim 5 wherein said moveable member includes a surface to preventing transverse movement of said detent members by said release member unless said moveable member is in a position corresponding to said latched position.

7. A dereefing cutter according to claim 1 wherein said release member inhibits operation of said timer when in said second position.

8. A dereefing cutter comprising: a housing having an aperture therein to accommodate a reefing line; a knife slidably mounted in said housing; a piston slidable along the longitudinal axis of said housing and operable to move said knife across said aperture and sever a reefing line located therein; spring means located between said housing and said piston in a direction to move said knife across said aperture; detent means operable between said housing and said piston, and including a support member fixed to said housing and a detent member carried by said support member and slidable relative thereto in a direction perpendicular to said longitudinal axis; a release member operable on said detent member and slidable relative to said housing from a first position in which said detent member is engaged with said piston to retain stored energy in said spring and a second position in which said detent member is moveable relative to said support member to release said piston for movement under the influence of said spring, the sliding movement of said release member from said first to said second position being in a direction opposite to the direction of movement of said piston under the influence of said spring; and said support member preventing movement of said detent member in a direction along said longitudinal axis, timing means to control movement of said release means and initiating means operable to initiate said timing means for deployment of a parachute to which said reefing line is attached, said timing means delaying operation of said release means for a predetermined period and beng interposed between said initiating means and said release means to prevent movement of said piston prior to the expiry of said predetermined period.

9. A dereefing cutter according to claim 8 wherein said release member is concentric with and located within said piston.

10. A dereefing cutter according to claim 9 wherein said support member is interposed between said release member and said piston.

11. A dereefing cutter according to claim 10 wherein said detent member includes a plunger engageable with a recess in said piston and said release member includes a groove aligned with said plunger when said release member is in said second position to enable said plunger to move out of said recess in a direction normal to the longitudinal axis and permit movement of said piston.

12. A dereefing cutter comprising: a housing having an aperture therein to accommodate a reefing line; a knife slidably mounted in said housing; a piston slidable along the longitudinal axis of said housing and operable to move said knife across said aperture and sever a reefing line located therein, spring means located between said housing and said piston to bias said piston in a direction to move said knife across said aperture, detent means operable between said housing and said piston, and including a support member fixed to said housing and a detent member carried by said support member and slidable relative thereto in a direction perpendicular to said longitudinal axis, said support member comprising a cylindrical projection on said housing and said piston is slidably mounted on said projection, said detent member comprising a plurality of plungers supported in apertures on said projection for movement transverse to said longitudinal axis, said piston including a groove alignable with said apertures to receive said plungers, a release member operable on said detent member to control transverse movement of said plungers, said release member being slidable relative to said housing from a first position in which said plungers are held in said groove to retain stored energy in said spring and a second position in which said plungers are moveable relative to said support member to release said piston for movement under the influence of said spring said support member preventing movement of said plungers in a direction along said longitudinal axis; and timing means to control movement of said release member and initiating means operable to initiate said timing means, said timing means delaying operation of said release means for a predetermined period and being interposed between said initiating means and said release member to prevent movement of said piston prior to the expiry of said predetermined period.

13. A dereefing cutter according to claim 12 wherein said release member is slidably received within said cylindrical projection and includes a surface engagable with said plungers, said surface having a recess movable into alignment with said apertures when said release member is in said second position to permit transverse movement of said plungers out of said groove in said piston.

14. A dereefing cutter according to claim 13 wherein said piston includes a surface adjacent said groove to overlie said apertures when said piston is released by said detent means, said surface holding said plungers in said recess to prevent movement of said release member from said second to said first position until said groove is aligned with said apertures.

15. A dereefing cutter according to claim 14 wherein movement of said release member is controlled by a cam rotatable with said timing device, said cam including a relieved portion to permit movement of said release member from said first to said second position.

16. A dereefing cutter according to claim 15 wherein said release member cooperates with said relieved portion to inhibit operation of said timer when said release member is in said second position.

17. A dereefing cutter according to claim 12 wherein said knife member is supported for sliding movement in an anvil removably secured to said housing, said anvil including a passage for alignment with aperture to receive said line.

18. A dereefing cutter according to claim 17 wherein said anvil includes a slot to receive said knife, said slot intersecting said passage and having a length greater than the length of said knife, said anvil providing an abutment for said piston to limit movement thereof under the influence of said spring and prevent said knife being driven against said anvil.

19. A dereefing cutter according to claim 18 wherein said knife is retained on said anvil by a shear pin, said piston engaging said knife to break said shear pin and move said knife along said slot and across said aperture.

20. A dereefing cutter for a parachute comprising a housing, an aperture in said housing to receive a reefing line, a knife to sever said reefing line and positioned to one side of said aperture, biasing means to bias said knife toward and across said aperture to sever a reefing line located in said aperture, latch means to oppose said biasing means and retain said knife to said one side, said latch means including a detent member slidably supported by a fixed member associated with said housing and operable upon a moveable member associated with said knife means, to hold said moveable member in a latched position against said biasing means, release means to release said latch means and permit movement of said knife means by said biasing means, said release means being operable to permit relative movement between said detent member and said fixed member to move said detent member out of latching engagement with said moveable member to permit relative movement, under the influence of said biasing means between said detent member and said moveable member, said release means including a release member moveable relative to said detent member from a first position in which said detent member prevents movement between said fixed and moveable members to a second position in which said detent member permits such relative movement, movement of said release member from said first to second position being in a direction opposite to that imparted to said moveable member by said biasing means.

* * * * *